April 15, 1930.  H. P. SCHMECK  1,755,030
TRACK CONSTRUCTION
Filed March 4, 1927

Inventor;
Herbert P. Schmeck
by his Attorneys
Howson & Howson

Patented Apr. 15, 1930

1,755,030

UNITED STATES PATENT OFFICE

HERBERT P. SCHMECK, OF PHILADELPHIA, PENNSYLVANIA, ASSIGNOR TO PHILADELPHIA TOBOGGAN COMPANY, OF PHILADELPHIA, PENNSYLVANIA, A CORPORATION OF PENNSYLVANIA

TRACK CONSTRUCTION

Application filed March 4, 1927. Serial No. 172,886.

My invention relates to amusement railway systems, and it has particular relation to track structures therefor.

One object of my invention is to provide a track structure that is simple in design, rigid in construction and economical to build.

Another object of my invention is to provide a track beam of such construction that extremely small track curvatures may be obtained even under extreme conditions of banking without the establishment of undesirable strains.

A further object of my invention is to provide a track beam, wherein the means for controlling the lateral displacement of the car is not rendered ineffective by the inoperation of the means for controlling the vertical displacement of the car, thus assuring the rider maximum safety.

A still further object of my invention is to provide means, whereby the horizontal and vertical wheels of the vehicle may be readily removed and, if desirable, interchanged with a minimum expenditure of time and effort.

With these and other objects and applications in view, my invention further consists in the details of construction and operation and arrangement, hereinafter described and claimed and illustrated in the accompanying drawing, wherein Fig. 1 is a transverse sectional view of a vehicle and supporting track structure therefor embodying my invention;

Figure 1:
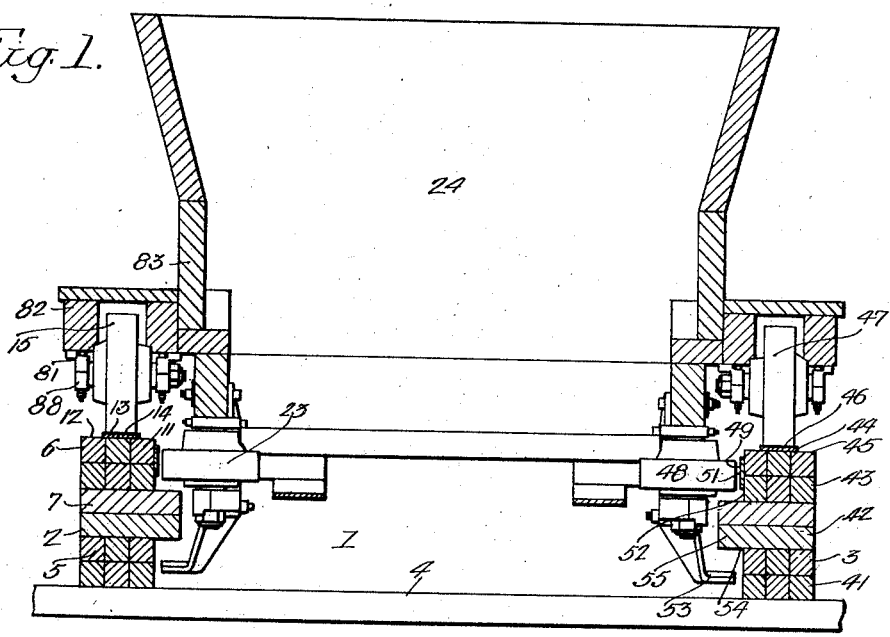
Figure 2:
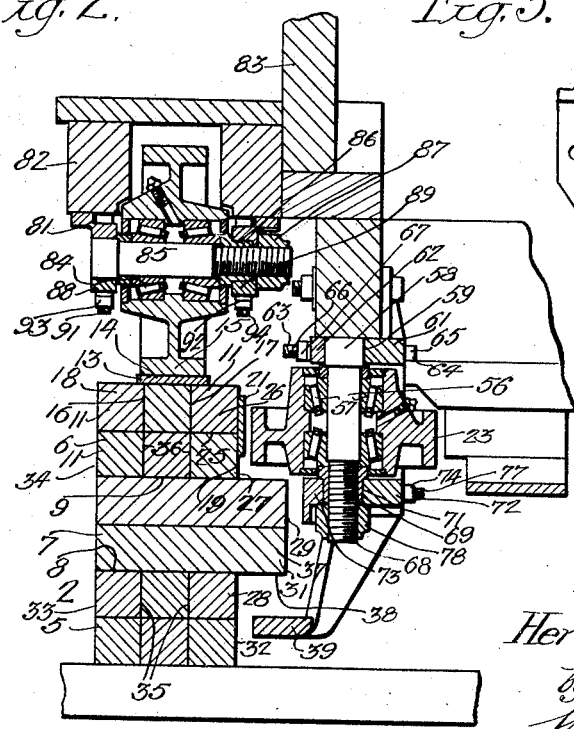
Fig. 2 is an enlarged detail vertical sectional view of one portion of the structure.
Figure 3:
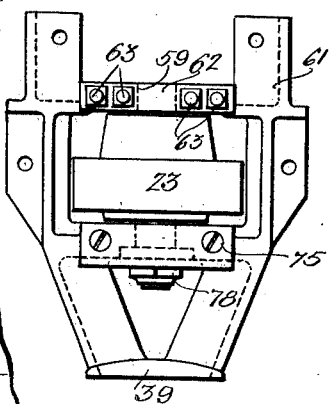
Fig. 3 is a detail, side elevational view of the supporting bracket for the horizontal wheel.

In the illustrated embodiment of my invention shown in the drawing, a track structure 1 comprises a pair of elongated track beams 2 and 3 which are mounted on a plurality of transversely extending tie beams 4, of which only one is shown. The track beam 2 may comprise a laminated base section 5, which is mounted directly on the tie beam 4, and an outer laminated track section 6, and an intermediate laminated section 7 which is mounted on an upper side 8 of the base section 5 and affords a lower side 9 of the track section 6 a support.

The outer track section 6 of the track beam 2 preferably comprises a plurality of elongated wooden bars 11 of rectangular cross section, which are disposed in side-by-side as well as superposed relation, so that the track section 6 is laminated horizontally as well as vertically. The bars 11 may be rigidly secured together to form a solid section by nails or other suitable means. A top side 12 of the track section 6 is provided with a rail element 13 affording a wearing surface 14 for a vehicle supporting wheel 15. The rail element 13 may be of sufficient width to overlie meeting edges 16 and 17 of the bars 11 positioned in an outer horizontal lamination 18 of the track section 6.

An inner side 19 of the track section 6 is also provided with a rail element 21 having a wearing surface 22 in operative relation to a horizontal vehicle wheel 23, whereby lateral movement of a vehicle 24 in the direction of the track section 6 may be limited to a desired safe value, as will presently appear in greater detail. The width of the side rail 21 is sufficient to cover meeting edges 25 of the superposed bars 26 and 27 constituting the inner vertical lamination of the track section 6.

The inner or base section 5 of the track beam 2 may comprise a plurality of relatively small elongated wooden bars 28 of rectangular cross section disposed in side-by-side as well as superposed relation, as in the outer track section 6. The base section 5 is thus also laminated horizontally and vertically, the several laminations being rigidly secured together by nails or other securing means (not shown). While the base section 5 is shown the same in dimensions as the outer track section 6, it, of course, may be enlarged by the use of an increased number of the bars 28. The outer track section 6 also may be provided with a greater or less number of bars 11 of desired dimensions, according to the characteristics of the particular rail system under construction.

The intermediate section 7 of the track beam 2 preferably comprises a pair of superposed planks 29 and 31 of sufficient width to extend between inner and outer sides 32—19 and 33—34 of the base and outer track sections 5 and 6, respectively. Thus, the vertical edges 35 and 36 of the bars in the base and outer track sections 5 and 6, respectively, are covered. The intermediate section 7 may be secured in position on the base section 5 by nails or other securing means (not shown). In actual practice, the bars 28 in the base section 5 are first rigidly secured together and the section as a whole bolted on the tie beams 4, whereupon the intermediate and outer track sections are successively secured in position.

The planks 29 and 31, constituting the intermediate section 7, preferably extend beyond the inner sides 32 and 19 of the inner and outer track sections 5 and 7, respectively, to provide an overhanging portion 37 defining an under rail surface 38. The surface 38 is positioned directly above an abutment or shoe 39 of the amusement car 24, the spacing being sufficient to limit to a safe value such vertical displacement of the car or vehicle 24 relative to the track beam 2 as tends to occur in dips or summits, all as will appear hereinafter in greater detail. Such construction has the advantage that the control of the lateral displacement of the amusement car 24 is not interfered with by the shearing of the shoe 39 or the overhanging portion 37, as would have been the case in the principal construction of the prior art.

Furthermore, it is noted that the construction of the inner and outer sections 5 and 6, respectively, of the track beam 2 of relatively small wooden bars greatly facilitates the building of small radius curves wherein the banking conditions are extreme. Such curved sections are characterized by the absence of heavy bending strains, such as would occur if wide planks were used instead of the narrow bars. Moreover the interconnection of the base and outer track sections 5 and 6, respectively, by the pair of relatively wide planks 29, 31 permits these sections to be rigidly secured together and assured an extremely strong track construction.

The track beam 3 is identical in construction with the track beam 2, comprising laminated base, intermediate and outer track sections 41, 42 and 43, respectively. A rail 44 is mounted on a top side 45 of the outer track section 43 and it affords a wearing surface 46 to a supporting car wheel 47 corresponding to the car wheel 15. Lateral displacement of the car 24 in the direction of the track beam 3 incident to travel over a curved section is limited by a horizontal wheel 48 which abuts against a wearing surface 49 of a vertical rail element 51 mounted on an inner side 52 of the track section 43. Vertical displacement of the car 24 immediately adjacent to the track beam 3 is limited to a safe value by means of an abutment 53 positioned in desired spaced relation to an under rail surface 54 of an overhanging portion 55 of the intermediate track section 42.

Hence, when the car 24 is traversing a curved track section, lateral displacement is limited to a safe value by one of the horizontal wheels 23, 48 moving into abutting relation with its co-operating rail the particular horizontal wheel in operation depending upon the direction of the track curvature. When the car reaches a track section involving a dip or summit, the safety of the rider is assured by the abutments 39, 53 and cooperating under rail surfaces 38, 54.

My invention embodies the still further feature of so mounting the horizontal and vertical wheels that the two are interchangeable. Considering the vertical and horizontal wheels 15 and 33 only, inasmuch as the mountings for the corresponding wheels 47 and 48 on the opposite side of the car are substantially identical therewith, the horizontal wheel 23 is mounted on a pin 56 by means of roller bearings 57. An upper end 58 of the pin 56 is of rectangular cross section and it may be clamped in a recess 59 of a bracket member 61 by means of a cap 62 and bolts 63, heads 64 of which are mounted on an inner side portion 65 of the bracket 61 while outer threaded ends 66 are engaged by locking nuts 67.

A lower threaded end 68 of the shaft 56 is provided with an adjusting nut 69, which fits in a recess 71 formed in a lower portion 72 of the bracket 61 positioned directly below the recess 59, and it may be clamped in position by a strap 73 and bolts 74, heads 75 of which are positioned on an outer side of the bracket 61, while threaded ends 76 and 77 are positioned on an inner side thereof. It is noted that the bolts 74 and 64 are oppositely directed so as to facilitate the ready removal thereof. The shaft 56 may be rigidly clamped in position by means of a nut 78 which abuts against an under side 79 of the lower bracket portion 72.

When it is necessary to remove the horizontal wheel assembly which includes the wheel 24, the shaft 56, the bearings 57, the adjusting nut 69 and the clamping nut 78, the bolts 64 and 74 are so loosened that the cap members 62 and 73 may be removed, whereupon said wheel assembly may be taken from the supporting bracket 61 and replaced should this be necessary.

The vertical wheel 15 is similarly mounted in a bracket 81, supported on a structure 82 extending from an outer side 83 of the car 24. The wheel assembly includes the wheel 15, bearings 84, a shaft 85, an adjusting nut 86 and a clamping nut 87, these parts being removably clamped in position by cap members 88, 89 and associated bolts 91 and 92, as in the case of the horizontal wheel 23. It is noted, that the bolts 91 and 92 are so positioned that nuts 93 and 94 thereof are both positioned on a lower side of the supporting frame 81 so as to be readily accessible.

When the vertical wheel assembly is to be removed, the general procedure set forth in connection with horizontal wheel 23 is repeated, inasmuch as the bolts 91 and 92 are loosened and the caps 89 and 91 removed to permit the withdrawal of the wheel 15 and associated parts from the supporting bracket frame 81. Inasmuch as the horizontal and vertical wheel assemblies are identical in construction, the number of parts that must be maintained for replacement purposes is very greatly decreased and the expense of repairing these parts correspondingly decreased.

While I have shown only one embodiment of my invention, for the purpose of describing the same and illustrating its principles of construction and operation, it is apparent that various changes and modifications may be made therein, without departing from the spirit of my invention, and I desire, therefore, that only such limitations shall be made thereon as are indicated in the appended claims or as are demanded by the prior art.

I claim:

1. A track beam comprising a plank, and a plurality of relatively small elongated bars, certain of which are mounted on said plank in side-by-side relation and others mounted on said last-mentioned bars in superposed relation.

2. A track beam comprising a relatively wide elongated plank and a plurality of relatively small elongated elements, certain of which are positioned in side-by-side relation and supported by said plank and others disposed in superposed relation to said last-mentioned bars, whereby a track beam of relatively small radius may be constructed with minimum initial strains.

3. In a track beam, the combination with a portion comprising a plurality of relatively narrow elongated elements disposed in side-by-side as well as superposed relation, of a relatively wide supporting member for said elements extending beyond said portion to form an abutting surface.

4. In a track beam, the combination with a portion comprising a plurality of relatively small wooden bars positioned in side-by-side and also superposed relation, of a plank affording said bars a support.

5. A track beam comprising a plurality of relatively small elongated elements so disposed as to form a section laminated horizontally as well as vertically, said track beam also comprising at least one supporting plank for said relatively small elements of sufficient width to cover the joints between certain of said elements.

6. In a track beam, the combination with a laminated base section, of a horizontally and vertically laminated upper section comprising a plurality of elongated bars, and an intermediate section comprising a plank of such width as to afford said upper section a supporting surface and also to extend beyond the same to provide a vehicle abutting surface.

7. In a track beam, the combination with a horizontally and vertically laminated upper section and a base section of an intermediate section mounted on said base section and affording said upper section a support, said intermediate section overhanging said base section to form an under rail surface.

8. In a track beam, the combination with a first section, of a second section adapted to support a vehicle wheel, and a third section interposed between said first and second sections and adapted to overhang said first section so as to form an under rail surface, said first and second sections comprising a plurality of relatively small bars, so that the track beam may be curved without establishing undesirable strains therein.

9. In a track beam, the combination with a pair of sections, each of which comprises a plurality of relatively small bars disposed in side-by-side as well as superposed relation, of a third section interposed between said pair of sections comprising at least one plank of such width as to afford one of said sections a support on the other end and to project beyond at least one of said sections, so that a vehicle abutting surface may be provided.

10. In a track beam, the combination with a base section comprising a plurality of relatively small wooden bars disposed in side-by-side relation, of an outer section also comprising a plurality of relatively small wooden bars, and an intermediate section comprising a plank positioned to overlie said wooden bars and having an extended portion adapted to serve as a vehicle abutting surface.

11. In a track beam, the combination with a base section comprising a plurality of relatively small wooden bars disposed in side-by-side as well as superposed relation and an upper section, of an intermediate section affording said upper section a support on said base section, said intermediate section comprising a plank overlying the meeting edges of adjacent bars in said sections and projecting beyond said lower section to afford an under rail surface.

12. In a track beam, the combination with a base section, of an outer section having top and side rail surfaces, and a third section positioned intermediate said base and outer sections and formed to overhang said base section so as to provide an under rail surface.

13. In a track beam, the combination with a base section, of an outer section having means disposed on the top and side thereof forming rail surfaces, and an intermediate section mounted on said base section and adapted to support said outer section, said intermediate section extending beyond said base section to form an under rail surface.

14. In a track beam, the combination with a base section comprising a plurality of relatively small bars disposed in side-by-side as well as superposed relation, of a track section also comprising a plurality of relatively small bars disposed in side-by-side as well as superposed relation and provided with top and side rails, and a plurality of planks mounted on said base section and affording said track section a support, said planks being of sufficient width to provide an under rail surface.

15. In a track beam, the combination with a base section comprising a plurality of wooden bars of rectangular cross section disposed in side-by-side as well as superposed relation, of a track section having top and side vehicle-engaging surfaces, and comprising a plurality of wooden bars of rectangular cross section and a laminated intermediate section comprising superposed planks mounted on said base section and affording said track section a support, at least one of said planks being extended to afford an under rail surface.

16. The combination with a vehicle having abutting surfaces of a track beam comprising a base section, a track section having an abutting surface in operative relation to one of said vehicle-abutting surfaces, and an intermediate section positioned to overhang said base section and disposed in operative relation to the other of said abutting surfaces, said track section comprising a plurality of relatively small bars disposed in side-by-side relation, whereby a desired curvature may be obtained in the track beam without subjecting the same to undesirable strains.

17. The combination with a coaster having a supporting wheel and abutting surfaces, of a track beam comprising a base section, an intermediate section adapted to overhang said base section so as to provide an under rail surface in operative relation to one of said coaster abutting surfaces, a track section mounted on said intermediate section comprising a plurality of relatively small bars disposed in side-by-side as well as superposed relation, and means positioned on the top and side of said track section adapted to afford wearing surfaces for said wheel and the other of said abutting surfaces.

18. The combination with a vehicle having a supporting wheel and a horizontal wheel, of a track beam comprising a track section having a top and side thereof disposed in operative relation to said supporting wheel and said horizontal wheel, respectively, said section comprising a plurality of bars disposed in side-by-side relation, and a supporting section comprising relatively wide planks adapted to provide an under rail surface, whereby lateral and vertical displacement of said vehicle may be limited to a desired value.

19. The combination with a vehicle having a supporting wheel, a horizontal wheel and an abutting surface, of a track beam having a track section provided with top and side rail elements affording wearing surfaces for said supporting wheel and said horizontal wheel, respectively, said track section comprising a plurality of relatively small bars disposed in side-by-side relation, whereby track curvatures may be obtained with minimum initial strain, and a supporting section comprising a relatively wide plank positioned to overhang said abutting surface, whereby undesirable vertical displacement of said vehicle may be prevented.

20. In an amusement system, the combination with a vehicle having a horizontal wheel and an abutting surface, of a track beam comprising a base section, a track section in operative relation to said horizontal wheel, and an intermediate section affording said abutting surface a rail surface, whereby vertical displacement of said vehicle may be limited, said track section comprising a plurality of relatively small bars disposed in side-by-side as well as superposed relation, said intermediate section comprising a relatively wide plank positioned to overlie said bars.

HERBERT P. SCHMECK.